UNITED STATES PATENT OFFICE.

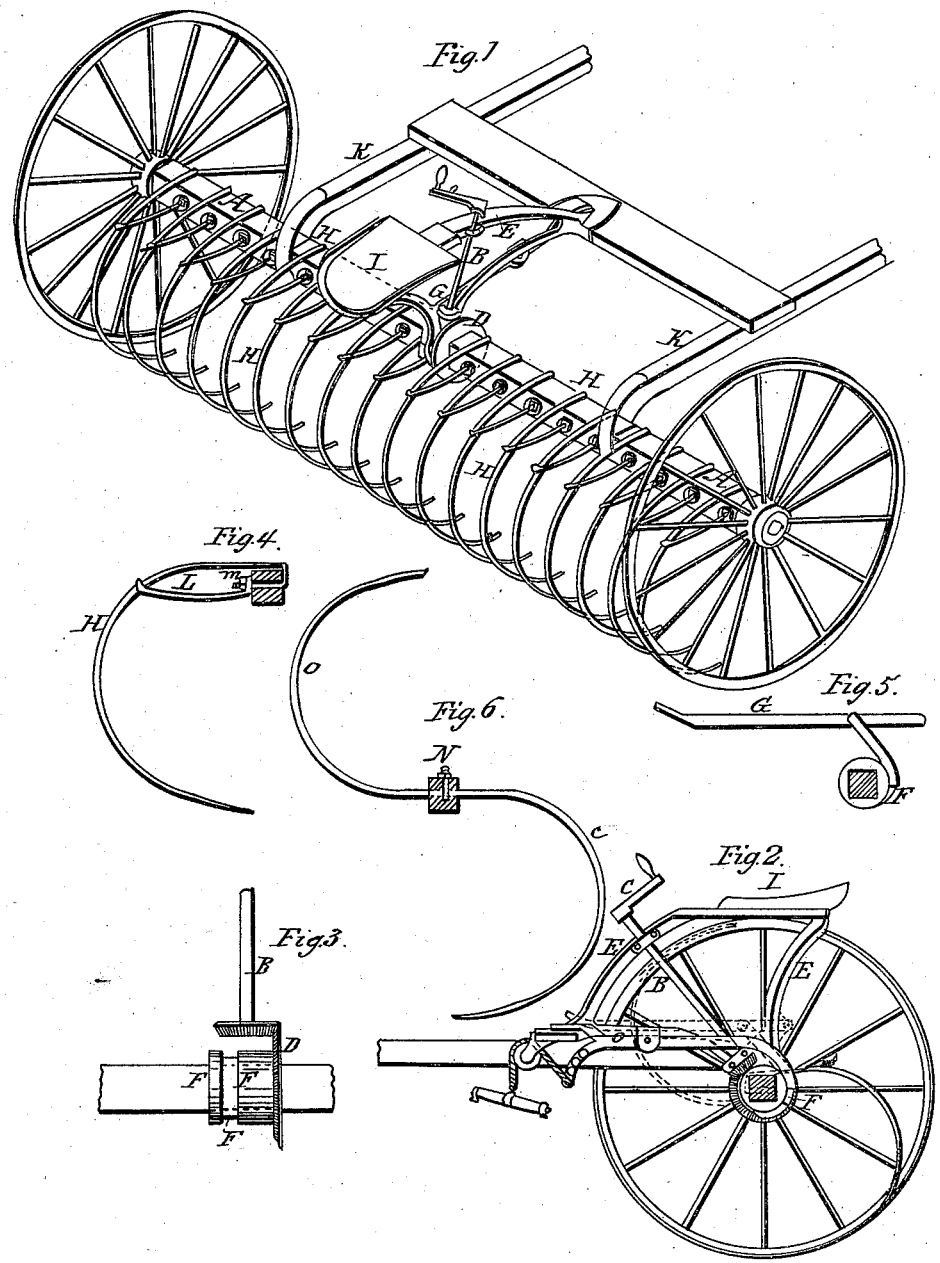
W. KING.
Horse Hay Rake.
No. 81,791. Patented Sept. 1, 1868.
Witnesses
Geo. O'Marcy
B. C. McQuisten
Inventor
Watson King

WATSON KING, OF SPRINGFIELD, ILLINOIS.

IMPROVEMENT IN HAY-RAKES.

Specification forming part of Letters Patent No. 81,791, dated September 1, 1868.

*To all whom it may concern:*

Be it known that I, WATSON KING, of Springfield, Sangamon county, State of Illinois, have invented an Improved Hay-Rake; and I do hereby declare that the following is a full, clear, and exact description of the construction and operation of the same, reference being had to the accompanying drawings, and to the letters of reference marked thereon.

A is a revolving axle, to which the teeth H are attached. C is the crank, B the shaft, and D the cog-wheel, which compose the gearing by which the axle A is made to revolve. G is a lever, and F is a collar encompassing the axle.

The collar F has a groove and a lug, as shown in Figure 5, in which the end of the lever runs when pressed down in front by the foot of the driver. The lever so pressed down keeps the axle and teeth in place when the rake is in operation. This collar also supports the lower end of the bracket or standard E, as shown in Figs. 5 and 2.

G in Fig. 2 is another lever, which can be used as a substitute for the lever in Fig. 5, the end of which is connected with a whiffletree, in the manner shown in Fig. 2, by a rope and pulley. A horse attached to the whiffletree draws upon the front end of the lever, and forces the back end down against the lug in the collar, which keeps the axle in place and the teeth on the ground.

E is a bracket or standard, which supports the seat and secures the gearing, lever, &c. I is a sliding seat, made so that it can be adjusted to the length of leg of the driver, it being slid back when a man is driving, and forward, nearer the lever, when a boy is driving.

Fig. 4 shows the tooth H, with the butt passing over and through the axle A, and secured by a nut on the outside; and extending from this nut to the center or bow of the tooth is the adjustable brace L, which is secured by the nut on the end of the tooth, and which can be tightened or loosened by screwing or unscrewing the nut whenever it is desired to decrease or increase the elasticity of the tooth, the object being to adapt the elasticity of the tooth to the ground over which it passes and the obstructions it has to encounter.

O in Fig. 6 is an S or double tooth, which passes through the axle A, to which it is secured by means of a loop-bolt, N, with nut, as shown in Fig. 6. This rake can be used either with double or single teeth.

K are the crooked shafts.

Operation: The teeth H being perfectly free, this rake can be backed without raising them, as the backward motion turns the points of the teeth upward, and the curved portion, at the back center of the tooth, touches and slides along the ground. Whenever you wish to dump the hay and form a windrow, the driver turns the crank C toward the right, and the axle revolves, and with it the teeth, throwing the back of the teeth in the front of the windrow, and starting them again close to the windrow. This operation clears everything from the rake each time, and dumps the hay compactly in one place, and commences to rake again so closely to the windrow on the other side that it leaves no streak of unraked hay.

What I claim as my invention, and desire to secure by Letters Patent, is—

1. The rotating of the axle A by means of the gearing C, B, and D, herein described, whether spur or beveled, as applied to hay-rakes.

2. The lever B C, as shown in Fig. 2, as applied to hay-rakes.

3. The collar F, in combination with the geared lever B and C, as herein arranged and described.

4. The tooth, as constructed in Fig. 4, in combination with the adjustable brace L and nut M.

5. The adjustable brace L, as herein arranged and described.

WATSON KING.

Witnesses:
GEO. O. MARCY,
B. C. McQUESTER.